United States Patent
Chin et al.

(10) Patent No.: US 10,564,914 B2
(45) Date of Patent: Feb. 18, 2020

(54) MULTI-PANEL DISPLAY DEVICE

(71) Applicant: LG Display Co., Ltd., Seoul (KR)

(72) Inventors: Mi-Hyung Chin, Paju-si (KR);
Seung-Soo Yang, Paju-si (KR);
Ju-Sang Rhim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 242 days.

(21) Appl. No.: 15/628,554

(22) Filed: Jun. 20, 2017

(65) Prior Publication Data

US 2017/0371612 A1    Dec. 28, 2017

(30) Foreign Application Priority Data

Jun. 27, 2016 (KR) .................. 10-2016-0080080

(51) Int. Cl.
| | |
|---|---|
| *G06F 3/14* | (2006.01) |
| *G02F 1/1345* | (2006.01) |
| *G09G 3/20* | (2006.01) |
| *G02F 1/1333* | (2006.01) |
| *G02F 1/1343* | (2006.01) |
| *G09G 3/36* | (2006.01) |
| *G02F 1/1335* | (2006.01) |

(52) U.S. Cl.
CPC .......... *G06F 3/1446* (2013.01); *G02F 1/1343* (2013.01); *G02F 1/1345* (2013.01); *G02F 1/13336* (2013.01); *G02F 1/13454* (2013.01); *G02F 1/13458* (2013.01); *G09G 3/20* (2013.01); *G09G 3/3666* (2013.01); *G02F 1/133514* (2013.01); *G02F 2001/13456* (2013.01); *G09G 2300/026* (2013.01); *G09G 2300/0426* (2013.01); *G09G 2310/0232* (2013.01)

(58) Field of Classification Search
CPC .......... G02F 1/13336; G02F 1/133514; G02F 1/1343; G06F 3/1446; G09G 3/3666
See application file for complete search history.

(56) References Cited

U.S. PATENT DOCUMENTS

| | | | |
|---|---|---|---|
| 8,780,015 B2 | 7/2014 | Watanabe | |
| 2006/0007054 A1* | 1/2006 | Chang | ................ G02F 1/13336 |
| | | | 345/1.3 |
| 2011/0025594 A1 | 2/2011 | Watanabe | |
| 2014/0037257 A1* | 2/2014 | Yang | .................... G02B 6/0078 |
| | | | 385/116 |

(Continued)

FOREIGN PATENT DOCUMENTS

| | | |
|---|---|---|
| CN | 1776461 A | 5/2006 |
| CN | 201289558 Y | 8/2009 |
| CN | 201319091 Y | 9/2009 |

(Continued)

OTHER PUBLICATIONS

China National Intellectual Property Administration, First Notification of Office Action, CN Patent Application No. 201710493649.5, dated Apr. 8, 2019, 25 pages.

*Primary Examiner* — Kenneth Bukowski
(74) *Attorney, Agent, or Firm* — Fenwick & West LLP

(57) ABSTRACT

A multi-panel display device includes a first display device including a first display region and a first non-display region surrounding the first display region; a first optical member located on the first display device and including optical fibers; and a first protection film covering an outside of the first optical member.

20 Claims, 5 Drawing Sheets

(56) References Cited

U.S. PATENT DOCUMENTS

2015/0092395 A1* 4/2015 Wu .................. G02B 6/0051
362/97.1
2015/0153902 A1* 6/2015 Suzuki ................ G06F 3/013
345/175

FOREIGN PATENT DOCUMENTS

| CN | 101706623 A | 5/2010 |
| CN | 101965604 A | 2/2011 |
| CN | 102087814 A | 6/2011 |
| CN | 102590905 A | 7/2012 |
| CN | 102610168 A | 7/2012 |
| CN | 102854644 A | 1/2013 |
| CN | 104424864 A | 3/2015 |

* cited by examiner

MULTI-PANEL DISPLAY DEVICE

CROSS REFERENCE TO RELATED APPLICATIONS

The present application claims the priority benefit of Korean Patent Application No. 10-2016-0080080 filed in Republic of Korea on Jun. 27, 2016, which is hereby incorporated by reference in its entirety for all purposes as if fully set forth herein.

BACKGROUND

Field of the Invention

The present disclosure relates to a multi-panel display device in which a plurality of display devices are connected to each other, and more particularly, to a multi-panel display device to reduce an image disconnection at a bezel region, which is a connection portion between display devices, happens.

Discussion of the Related Art

Facing information society, display field of processing and displaying a massive amount of information has been rapidly advanced, and accordingly, various display devices have been developed and used.

As display devices, liquid crystal display devices (LCD), plasma display panel devices (PDP), field emission display devices (FED), electroluminescent display devices (ELD), organic light emitting diode (OLED) display devices, and the like are used.

These display devices have excellent performances of thin profile, light weight and low power consumption, and have rapidly replaced conventional cathode ray tubes (CRTs).

The display devices have advantages in high display quality, ultra-thin profile, light weight, large size, space utilization, interior and design, and can have various application filed.

Particularly, in order to realize one image in a large screen (e.g., about 100 inches) like a video wall, a multi-panel display device in a so-called tiled type with a plurality of display devices combined have been actively researched.

However, in the case of the multi-panel display device, a bezel region of each of the plurality of display devices reduces a continuity of image.

SUMMARY OF THE INVENTION

Accordingly, the present disclosure is directed to a multi-panel display device that substantially reduces one or more of the problems due to limitations and disadvantages of the related art.

An objective of the present disclosure is to provide a multi-panel display device that can have an improved continuity of image.

Another objective of the present disclosure is to provide a multi-panel display device that can prevent a breakage due to collision of optical members.

Yet another objective of the present disclosure is to provide a multi-panel display device that can prevent a rainbow phenomenon due to a chromatic dispersion by an optical member.

Additional features and advantages will be set forth in the description which follows, and in part will be apparent from the description, or may be learned by practice of the present disclosure. These and other advantages will be realized and attained by the structure particularly pointed out in the written description and claims hereof as well as the appended drawings.

To achieve these and other advantages and in accordance with the purpose of the present invention, as embodied and broadly described herein, a multi-panel display device includes a first display device including a first display region and a first non-display region surrounding the first display region; a first optical member located on the first display device and including optical fibers; and a first protection film covering an outside of the first optical member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to various embodiments, examples of which are illustrated in the accompanying drawings. The same reference numbers may be used throughout the drawings to refer to the same or like parts.

Figure 1:
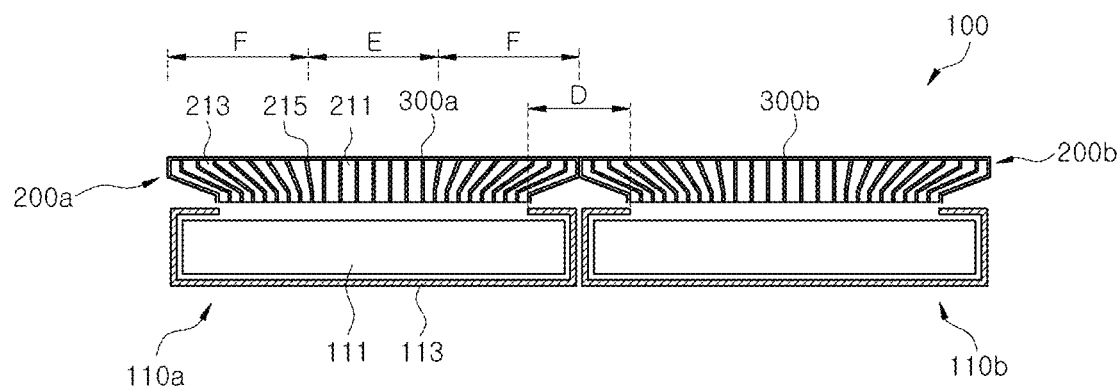
FIG. 1 is a cross-sectional view illustrating a portion of a multi-panel display device according to a first embodiment.
Figure 2:
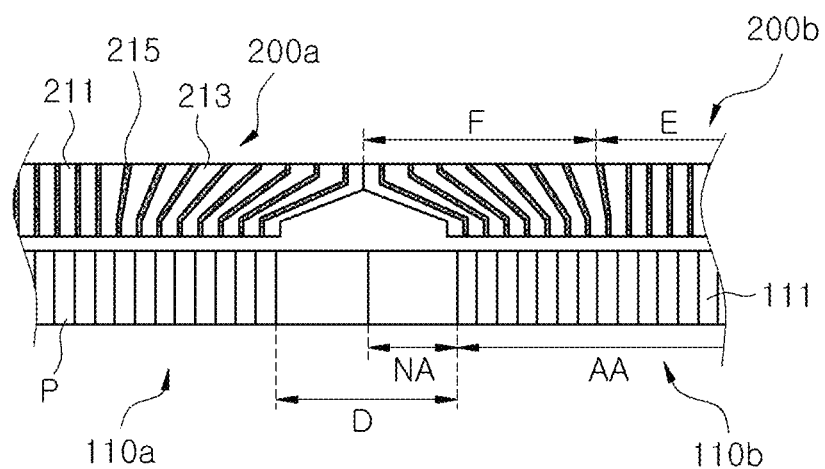
FIG. 2 is a schematic view illustrating a configuration for compensating an image disconnection phenomenon with an optical member including optical fibers according to the first embodiment.

FIG. 1 is a cross-sectional view illustrating a portion of a multi-panel display device according to a first embodiment, and FIG. 2 is a schematic view illustrating a configuration for compensating an image disconnection phenomenon with an optical member including optical fibers according to the first embodiment.

The multi-panel display device 100 has a structure that a plurality of display devices 110a and 110b are connected in a tiled type. On the respective display devices 110a and 110b, entire-surface type optical members 200a and 200b are located. Each of the optical members 200a and 200b include optical fibers 211 and 213 to overcome an image disconnection phenomenon at the connection portion of the display devices 110a and 110b.

In more detail, in order to realize one image in a large screen of about 100 inches or more, like a video wall, the multiple display devices 110a and 110b are arranged in a tiled type.

In this case, the display devices 110a and 110b each include a display panel 111 outputting image signals, which are supplied from an external system, and a housing 113 that accommodates the display panel 111 and protects the display panel 111 and other parts.

The display panel 111 may be formed using one of an LCD, a PDP, an FED, an ELD, and an OLED. The LCD does not have an self-luminous element and uses a separate light source.

Accordingly, in the case of the LCD, a backlight unit having a light source is placed below the LCD, and a light is irradiated to the LCD thereby displaying an image.

Even though not shown in the drawings, the LCD includes a liquid crystal panel that includes first and second substrates and a liquid crystal layer between the first and second substrates, and a backlight unit below the liquid crystal panel.

In this case, on an inner surface, a plurality of gate lines and a plurality of data lines crossing each other to define a plurality of pixel regions are formed, a thin film transistor is formed in each pixel region at the crossing portion of the gate and data lines, and a plurality of pixel electrodes connected to the thin film transistor through a drain contact hole and made of a transparent conductive material are formed in each pixel region.

The thin film transistor includes a gate electrode, a gate insulating layer, a semiconductor layer, and source and drain electrodes.

The pixel electrodes each have a bar shape and are separated from each other in each pixel region. Furthermore, a common line may be formed at the same layer as the gate line and be parallel with the gate line. A plurality of common lines electrically connected to the common line may be formed and may alternate with and be spaced apart from the pixel electrodes in each pixel region.

Alternatively, the pixel electrode may be formed in a plate shape in each pixel region, and in this case, a portion of the pixel electrode may overlap the gate line to form a storage capacitor.

In the embodiment where the plurality of pixel electrodes and the plurality of common electrodes are configured to be spaced apart from each other, the first substrate operated in an IPS (in-plane switching) mode is formed. In the embodiment where the plate-shaped pixel electrode is formed at the first substrate excluding the common electrode, the first substrate operated in an TN (twisted nematic) mode, ECB (electrically controllable birefringence) mode, or VA (vertically aligned) mode is formed.

On an inner surface of the second substrate facing the first substrate, red (R), green (G), and blue (B) color filters corresponding to the respective pixel regions, and a black matrix surrounding each color filter and covering non-display elements such as the gate and data lines and the thin film transistor are formed.

Polarizing plates may be attached on outer surfaces of the first and second substrates, respectively.

A backlight unit supplying a light to the liquid crystal panel is employed. The backlight unit may refract a light, which is emitted from a light source at one side surface of the rear of the first substrate, using a light guide plate to enter light to the liquid crystal panel.

The backlight unit may be categorized into a side type or direct type according to a position of a light source. In the side type, a light emitted from a light source located at one side surface of the rear of the liquid crystal panel is refracted through the light guide plate and travels toward the liquid crystal panel. In the direct type, a plurality of light sources is located below the liquid crystal panel and emit lights toward the liquid crystal panel.

The light source may use a CCFL (cold cathode fluorescent lamp), EEFL (external electrode fluorescent lamp), or LED (light emitting diode) lamp.

Each of the display devices 110a and 110b has a bezel region D. At the bezel region D of each of the display devices 100a and 100b, an image disconnection phenomenon, where no image is display may occur.

Accordingly, by using the entire-surface type optical members 200a and 200b, for enlarging and displaying a portion of an image in the connection portion of the display devices 110a and 110b, substantially on the entire surfaces of the respective display devices 110a and 110b, a portion of an image realized by the display devices 110a and 110b are enlargedly displayed at the bezel region D of the display devices 110a and 110b through the entire-surface type optical members 200a and 200b, and thus the image disconnection phenomenon happening at the bezel region D can be prevented.

In other words, referring to FIG. 2, each of the display devices 110a and 110b includes a display region AA displaying an image at a center of the display panel 111, and a non-display region NA surrounding edges of the display region AA not displaying an image.

The non-display region NA may be formed by a non-display region of the display panel 111 itself, and the housing 113 to modulize the display panel 111.

Since the non-display region NA is included in each of the display devices 110a and 110b, at the bezel region D, which is the connection portion of the first and second display devices 110a and 110b, the image disconnection phenomenon happens.

In the case of using the entire-surface type optical members 200a and 200b on the display devices 110a and 110b, respectively, a light path of an image realized by each of the display devices 110a and 110b is refracted or enlarged, an image is displayed at the non-display region NA of the bezel region D, and thus the image disconnection phenomenon can be prevented.

Each of the entire-surface type optical members 200a and 200b includes a plurality of optical fibers 211 and 213 and resin support portions 215 that are located between the optical fibers 211 and 213 to combine and support the optical fibers 211 and 213. The optical fibers 211 and 213 each include an input portion (e.g., 213b of FIG. 3A) at a bottom end, an output portion (e.g., 213a of FIG. 3A) at a top end, and a transmission portion (e.g., 213c of FIG. 3A) connecting the input portion and the output portion. The entire-surface type optical members 200a and 200b are optically transparent.

Each of the entire-surface type optical member 200a and 200b is on each of the display devices 110a and 110b such that the input portions (e.g., 213b of FIG. 3A) face the corresponding display panel 111. Each of the optical fibers 211 and 213 is located with each input portion (e.g., 213b of FIG. 3A) thereof corresponding to each pixel region P of the display panel 111 thus receiving light from the corresponding pixel region P through the input portion, totally reflecting the light in the transmission portion (e.g., 213c of FIG. 3A), and outputting the light through the output portion (e.g., 213a of FIG. 3A). Accordingly, an image realized by the display panel 111 is displayed on a top surface of each of the optical members 200a and 200b.

The optical fibers 211 and 213 in the entire-surface type optical members 200a and 200b include a core portion located at a center and a cladding portion surrounding the core. The core has a refractive index greater than that of the cladding portion, thus a light input through the input portion (e.g., 213b of FIG. 3A) is totally refracted in the transmission portion (e.g., 213c of FIG. 3A) and transferred to the output portion (e.g., 213a of FIG. 3A).

In this case, the entire-surface type optical members 200a and 200b have a plate shape and is defined to be divided into a non-enlarging region E at a center portion and an enlarging region F at a peripheral portion surrounding the non-enlarging portion E. The plurality of optical fibers 211 and 213 are defined to be divided into a plurality of first optical fibers 211 located at the non-enlarging region E and a plurality of second optical fibers 213 located at the enlarging region F.

The first optical fiber 211 is a straight line type optical fiber intactly outputting a light input from the input portion, and the input portion and the output portion of the first optical fiber 211 may have substantially the same size.

The first optical fiber 211 transfers an image of the corresponding pixel region P without enlarging into the top of each of the entire-surface type optical member 200a and 200b.

Figure 3A:
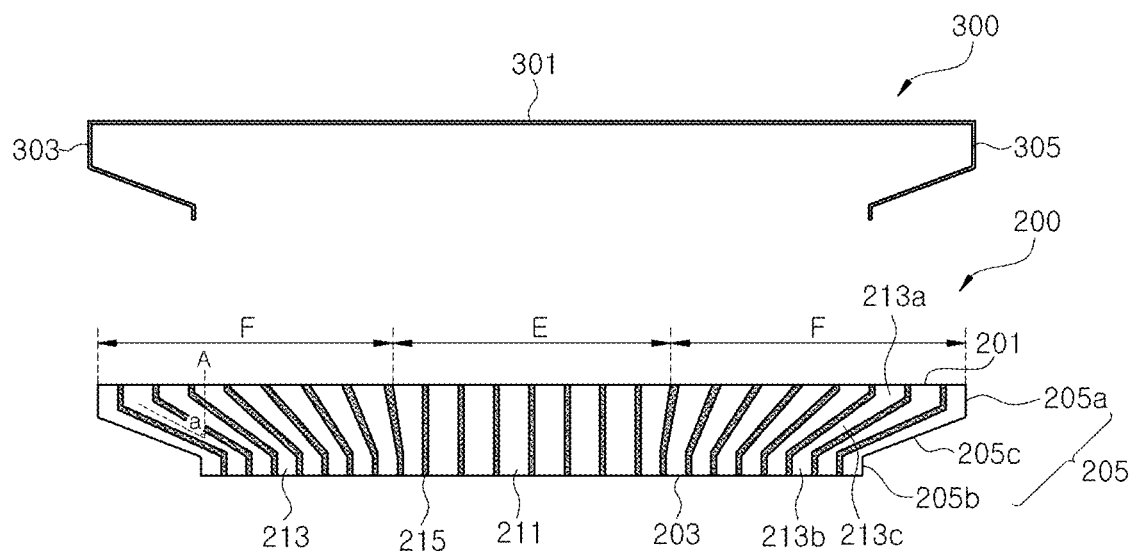
FIGS. 3A to 3C are cross-sectional views illustrating a entire-surface type optical member and a protection film according to the first embodiment.

The second optical fiber 213 is a refractive type optical fiber that refracts and enlarges a light in process of outputting the light input from the input portion (213b of FIG. 3A) into the output portion (213a of FIG. 3A). The second optical fiber 213 enlarges an image of the corresponding pixel region P to a predetermined size and transfers the image into the top of each of the entire-surface type optical member 200a and 200b.

To do this, in each second optical fiber 213 at the enlarging region F, the input portion (213b of FIG. 3A) and the output portion (213a of FIG. 3A) are not aligned in a line. The input portions (213b of FIG. 3A) of the second optical fibers 213 are located corresponding to pixel regions P at the periphery of the display panel 111 while the output portions (213a of FIG. 3A) are located corresponding to the non-display region NA. Accordingly, the second optical fibers 213 have a refracted structure that inclines toward the non-display region NA.

According to a ratio of a size of the output portion (e.g., 213a of FIG. 3A) to a size of the input portion (e.g., 213b of FIG. 3A), an image enlarging ratio by each of the optical fibers 211 and 213 is decided. In the entire-surface type optical members 200a and 200b of this embodiment, the second optical fibers 213 at the enlarging region F is formed such that the output portion (213a of FIG. 3A) is greater than that of the input portion (213b of FIG. 3A).

Accordingly, by making lights from the input portion (213b of FIG. 3A) totally refracted and output through the output portion (213a of FIG. 3A) greater than the input portion, an image of the corresponding pixel region is enlarged by the size ratio of the output portion to the input portion and viewed.

Thus, images are displayed even in the non-display regions NA of the display devices 110a and 110b. Accordingly, when realizing one image through the display devices 110a and 110b, an image disconnection phenomenon at the bezel region D of the connection portion of the display devices 110a and 110b can be reduced.

The resin support portion 215 may be made of a thermosetting resin or UV curable resin. In this case, by arranging the first optical fibers 211 and the second optical fibers 213, interposing a resin between the optical fibers 211 and 213 and curing the resin with heat or UV, the entire-surface type optical members 200a and 200b including the optical fibers 211 and 213 can be fabricated.

It is preferable, but not limited, that the resin support portion 215 is made of an optically transparent resin. Furthermore, a refractive index of the resin making the resin support portion 215 is less than that of each of the first and second optical fibers 211 and 213.

As described above, through the entire-surface type optical members 200a and 200b on the respective display devices 110a and 110b of the multi-panel display device 100 of this embodiment, an image is displayed in the non-display regions NA of the display devices 110a and 110b. Accordingly, when realizing one image through the display devices 110a and 110b, an image disconnection phenomenon at the bezel region D of the connection portion of the display devices 110a and 110b can be reduced.

The entire-surface type optical members 200a and 200b may be inserted in respective protection films 300a and 300b. In detail, each of the optical members 200a and 200b may be put in an inside space of each of the protection films 300a and 300b. Accordingly, each of the protection films 300a and 300b covers an outside of each of the optical members 200a and 200b.

Through this, in the multi-panel display device 100 of this embodiment, a breakage happening due to collision between the entire-surface type optical members 200a and 200b can be prevented.

The protection films 300a and 300b which the entire-surface type optical members 200a and 200b are inserted into are explained with reference to FIGS. 3A to 3C.

Figure 3B:
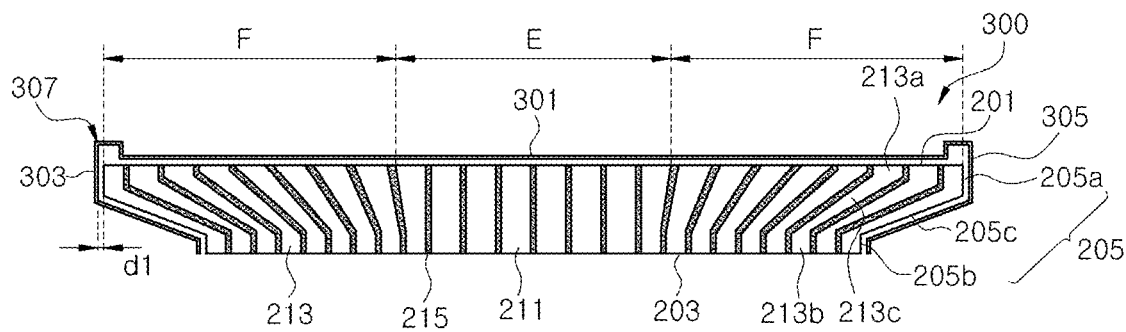
Figure 3C:
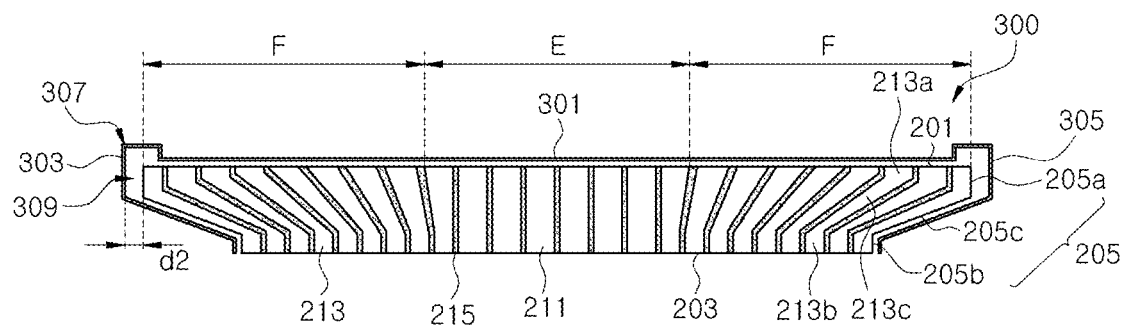

FIGS. 3A to 3C are cross-sectional views illustrating a entire-surface type optical member and a protection film according to the first embodiment.

The entire-surface type optical member 200 is located on each of the display devices (110a and 110b of FIG. 2) when fabricating the multi-panel display device (100 of FIG. 1) with the display devices (110a and 110b of FIG. 2) connected to each other.

The entire-surface type optical member 200 is defined to be divided into a non-enlarging region E at a center portion and an enlarging region F at a peripheral portion surrounding the non-enlarging region E. The plurality of optical fibers 211 and 213 are defined to be divided into a plurality of first optical fibers 211 located at the non-enlarging region E and a plurality of second optical fibers 213 located at the enlarging region F.

A shape of the entire-surface type optical member 200 is described in detail as follows. The entire-surface type optical member 200 includes a first top surface portion 201 which an image realized by the display panel (111 of FIG. 2) is output through, a first bottom surface portion 203 which is opposite to the first top surface portion 201 and faces the display panel (111 of FIG. 2), and side surfaces 205 which connect the first top surface portion 201 and the first bottom surface portion 203 at both sides.

The first and second optical fibers 211 and 213 of the entire-surface type optical member 200 have the input portions 213b located at the first bottom surface portion 203 and facing the display panel (111 of FIG. 2) and the output portions 213a located at the first top surface portion 201 thus output lights of the display panel (111 of FIG. 2) input through the input portions 213b into the output portions 213a through the transmission portions 213c. For ease of illustration, the input portions, the output portions, and the transmission portions of the first optical fibers 211 are not numbered in the drawings.

The second optical fibers 213 at the enlarging region F each have the transmission portion 213c, which is between the input portion 213b and the output portion 213a, inclined at a predetermined amount in order to have the inclined refracted structure toward the non-display region (NA of FIG. 2).

In other words, the transmission portion 213c of the second optical fiber 213 makes an angle "a" with a normal direction A of the display panel (111 of FIG. 2).

Accordingly, each side surface 205 includes a first vertical portion 205a which is perpendicular to the first top surface portion 201 and corresponds to the output portion 213a, a second vertical portion 205b which is perpendicular to the first bottom surface portion 203 and corresponds to the input portion 213b, and an inclined surface 205c which connects the first and second vertical portions 205a and 205b and corresponds to the transmission portion 213c.

The entire-surface type optical member 200 of this embodiment is inserted into the protection film 300. As shown in FIG. 3A, the protection film 300 may have a shape that substantially corresponds to the first top surface portion 201, and the first and second vertical portions 205a and 205b and the inclined surfaces 205c of the both side surfaces 205. As such, the protection film 300 may substantially cover all the surfaces except for the first bottom surface portion 203 of the entire-surface type optical member 200.

In other words, the protection film 300 may include a first cover portion 301 corresponding to the first top surface portion 201, and second and third cover portions 303 and 305 corresponding to the both side surfaces 205.

The protection film 300 is made of a plastic material, such as polycarbonate (PC), poly methyl methacrylate (PMMA) or the like, or a polyethylene-based material containing a terephthalic acid of a good dimensional stability, such as polyethylene terephthalate (PET) or the like, and the protection film 300 can relieve an impact applied from the outside and protect the entire-surface type optical member 200.

Particularly, this protection film 300 is easy to be restored to its shape even though an external force is applied, and thus an impact from the outside can be further relieved.

As shown in FIG. 3B, the protection film 300 is coupled to the entire-surface type optical member 200 with a gap d1 of about 0.1 mm therebetween. Accordingly, an external impact can be further relieved, and also, the protection film 300 can be easily detached from and coupled to the entire-surface type optical member 200.

Further, the protection film 300 may further include reinforcing protrusion portions 307, which are protruded from the first cover portion 301 and between the first cover portion 301, and the second and third cover portions 303 and 305.

Even though a collision happens between the neighboring entire-surface type optical members 200, an impact can be relieved because of the reinforcing protrusion portions 307, thus a transfer of the impact to the entire-surface type optical members 200 can be reduced, and thus the entire-surface type optical members 200 can be prevented from being broken.

Furthermore, as shown in FIG. 3C, by forming a gap d2 of about 0.1 mm to 1 mm between the first vertical portion 205a of the side surface 205 of the entire-surface type optical member 200 and each of the second and third cover portions 303 and 305, an impact relieving region 309 may be obtained between the first vertical portion 205a and the protection film 300. The gap d2 may be greater than the gap d1.

Even though a collision happens between the neighboring entire-surface type optical members 200, an impact can be further relieved because of the impact relieving region 309, and thus the entire-surface type optical members 200 can be prevented from being broken.

As described above, in the multi-panel display device (100 of FIG. 1) of this embodiment, the entire-surface type optical member 200 on each of the display devices (110a and 110b of FIG. 2) is inserted into and coupled to the protection film 300. Accordingly, breakage of the entire-surface type optical members 200 due to collision therebetween can be prevented.

According to this embodiment, in the multi-panel display device (100 of FIG. 1), the entire-surface type optical member 200 on each of the display devices (110a and 110b of FIG. 2) is inserted into and coupled to the protection film 300. Thus, when realizing one image through the display devices (110a and 110b of FIG. 2), an image disconnection phenomenon at the bezel region (D of FIG. 2) can be reduced, and also, breakage of the entire-surface type optical members 200 due to collision therebetween can be prevented.

Figure 4:
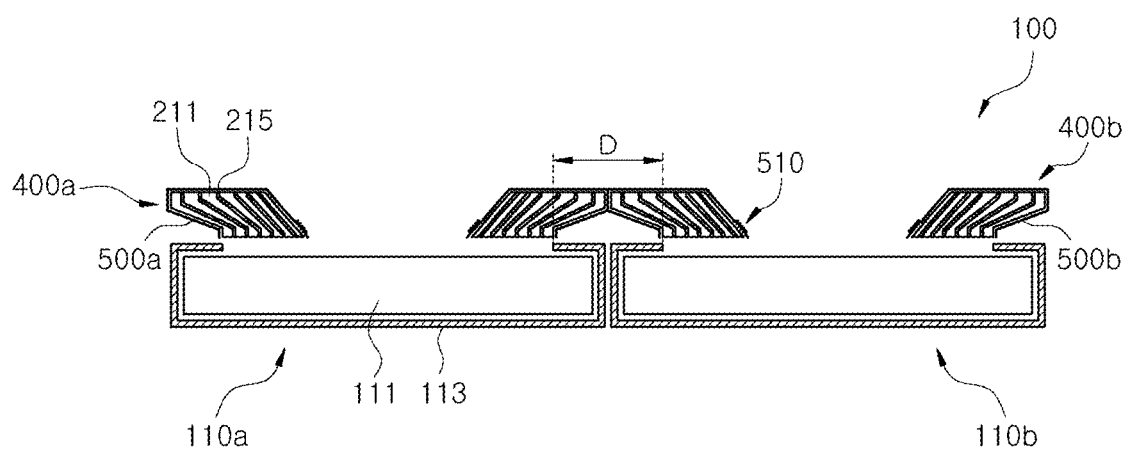
FIG. 4 is a cross-sectional view illustrating a portion of a multi-panel display device according to a second embodiment.
Figure 5:
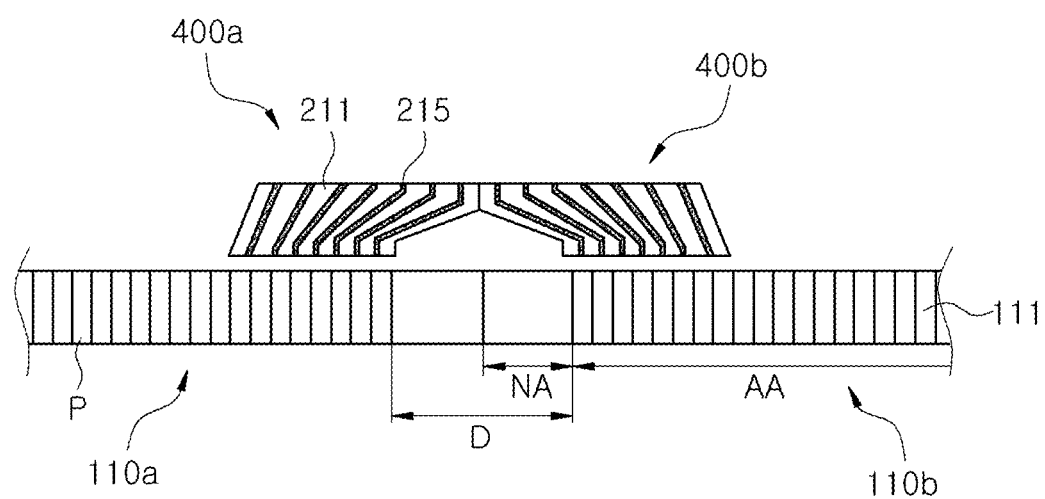
FIG. 5 is a schematic view illustrating a configuration for compensating an image disconnection phenomenon with an optical member including optical fibers according to the second embodiment.

FIG. 4 is a cross-sectional view illustrating a portion of a multi-panel display device according to a second embodiment, and FIG. 5 is a schematic view illustrating a configuration compensating for an image disconnection phenomenon with an optical member including optical fibers according to the second embodiment.

For the purpose of explanations, the same reference numbers as in the first embodiment may be used to refer to the same parts and explanations of the same parts may be omitted.

The multi-panel display device 100 has a structure that a plurality of display devices 110a and 110b are connected in a tiled type. On the respective display devices 110a and 110b, frame type optical members 400a and 400b are located which each include optical fibers 211 to overcome an image disconnection phenomenon at a bezel region D that is the connection portion of the display devices 110a and 110b.

In other words, the display devices 110a and 110b each include a display panel 111 outputting image signals, which are supplied from an external system, and a housing 113 that accommodates the display panel 111 and protects the display panel 111 and other parts. Referring to FIG. 5, each of the display devices 110a and 110b having the respective display panels 111 where a plurality of pixel regions P includes a display region AA displaying an image at a center of the display panel 111, and a non-display region NA surrounding edges of the display region AA not displaying an image.

The non-display region NA may be formed by a non-display region of the display panel 111 itself, and the housing 113 to modulize the display panel 111.

Since the non-display region NA is included in each of the display devices 110a and 110b, at the bezel region D, which is the connection portion of the first and second display devices 110a and 110b, the image disconnection phenomenon happens.

In case of locating the frame type optical members 400a and 400b on the display devices 110a and 110b, respectively, a light path of an image realized by each of the display devices 110a and 110b is refracted or enlarged, an image is displayed at the non-display region NA of the bezel region D, and thus the image disconnection phenomenon can be reduced.

The frame type optical members 400a and 400b of this embodiment each have a ring shape such that each of the optical members 400a and 400b corresponds to a periphery of each of the display devices and has an opening therein.

Each of the frame type optical members 400a and 400b includes a plurality of optical fibers 211 and resin support portions 215 that are located between the optical fibers 211 to combine and support the optical fibers 211. The optical fibers 211 each include an input portion (211b of FIG. 6A) at a bottom end, an output portion (211a of FIG. 6A) at a top end, and a transmission portion (211c of FIG. 6A) connecting the input portion and the output portion. The frame type optical members 400a and 400b are entirely optically transparent.

Figure 6A:
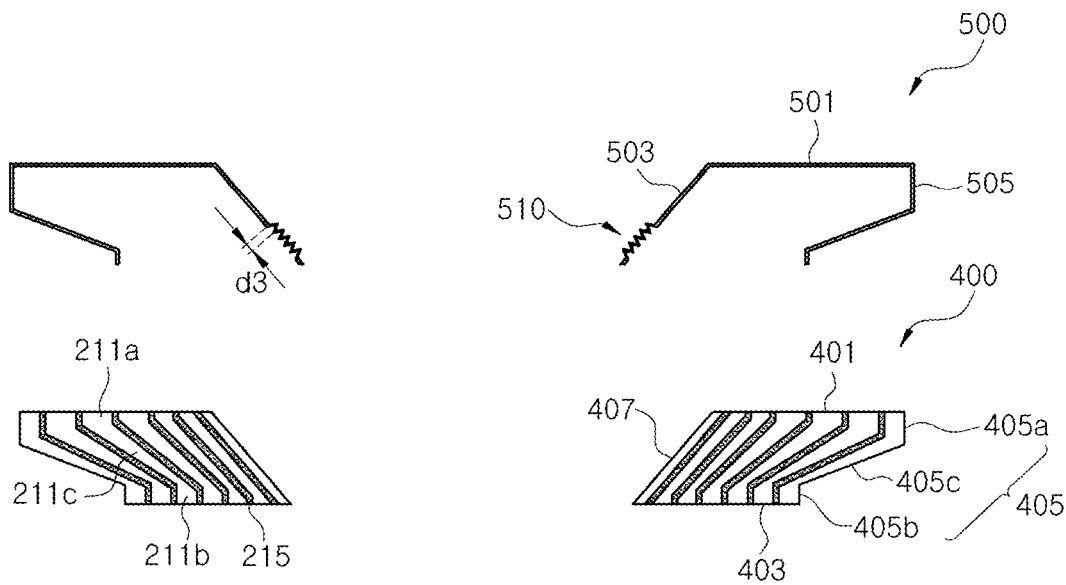
FIGS. 6A to 6D are cross-sectional views illustrating a frame type optical member and a protection film according to the second embodiment.

The optical fiber 211 is a refractive type optical fiber that refracts and enlarges a light in process of outputting the light input from the input portion (211b of FIG. 6A) into the output portion (211a of FIG. 6A). The optical fiber 211 enlarges an image of the corresponding pixel region P to a predetermined size and transfers the image into the top of each of the frame type optical member 400a and 400b.

Each of the frame type optical member 400a and 400b is on each of the display devices 110a and 110b such that the input portions (211b of FIG. 6A) face the corresponding display panel 111. Each optical fiber 211 is located with its input portion (211b of FIG. 6A) thereof corresponding to a pixel region P of the display panel 111 thus receives a light from the corresponding pixel region P through the input portion then totally reflect the light in the transmission portion (211c of FIG. 6A) and then outputs the light through the output portion (211a of FIG. 6A). Accordingly, an image realized by the display panel 111 is displayed on a top surface of each of the optical members 400a and 400b.

Thus, images are displayed even in the non-display regions NA of the display devices 110a and 110b. Accordingly, when realizing one image through the display devices 110a and 110b, an image disconnection phenomenon at the bezel region D of the connection portion of the display devices 110a and 110b can be reduced.

The frame type optical members 400a and 400b may be inserted in respective protection films 500a and 500b.

Through this, in the multi-panel display device 100 of this embodiment, a breakage happening due to collision between the frame type optical members 400a and 400b can be prevented.

The protection films 500a and 500b which the frame type optical members 400a and 400b are inserted into are explained with reference to FIGS. 6A to 6D.

FIGS. 6A to 6D are cross-sectional views illustrating a frame type optical member and a protection film according to the second embodiment.

Figure 7A:
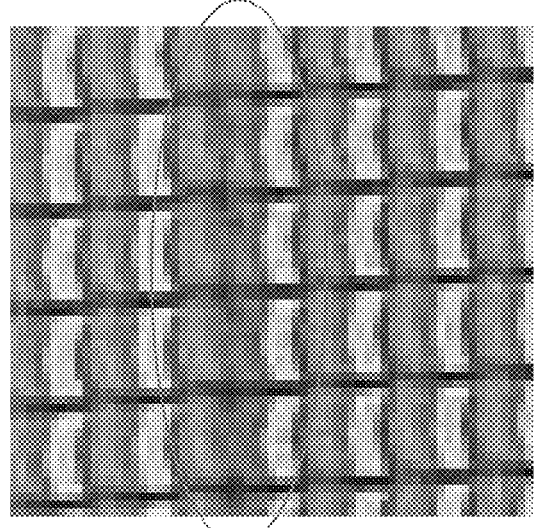
FIG. 7A is a view showing an experiment result that a rainbow phenomenon happens due to a chromatic dispersion.
Figure 7B:
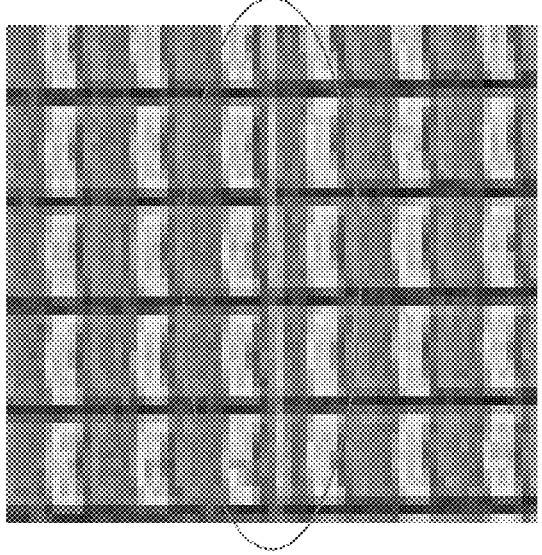
FIG. 7B is a view showing an experimental result that a rainbow phenomenon is concealed by a protection film of the second embodiment.

FIG. 7A is a view showing an experiment result that a rainbow phenomenon happens due to a chromatic dispersion, and FIG. 7B is a view showing an experimental result that a rainbow phenomenon is concealed by a protection film of the second embodiment.

Referring to FIGS. 6A to 6D, the frame type optical member 400 is located on each of the display devices (110a and 110b of FIG. 5) when fabricating the multi-panel display device (100 of FIG. 4) with the display devices (110a and 110b of FIG. 5) connected to each other.

The optical member 400 is formed in a frame type of a ring shape. A shape of the frame type optical member 400 is described in detail as follows. The frame type optical member 400 is configured corresponding to a portion of a periphery of the display panel (111 of FIG. 5) and the bezel region (D of FIG. 5) of each of the display devices (110a and 110b of FIG. 5).

The frame type optical member 400 includes a second top surface portion 401 which an image realized by the pixel regions (P of FIG. 5) of the display region (AA of FIG. 5) located at a periphery of the display panel (111 of FIG. 5) is output through, a second bottom surface portion 403 which is opposite to the second top surface portion 401 and covers a portion of a periphery of the display region (AA of FIG. 5) of the display panel (111 of FIG. 5), and an inner inclined surface 407 and an outer side surface 405 which each connect the second top surface portion 401 and the second bottom surface portion 403.

The optical fibers 211 of the frame type optical member 400 have the input portions 211b located at the second bottom surface portion 403 and facing the portion of the periphery of the display panel (111 of FIG. 5), and the output portions 211a located at the second top surface portion 401 and corresponding to the non-display region NA of each of the display devices (110a and 110b of FIG. 5).

Thus, the optical fibers 211 output lights, which is realized at the periphery of the display region (AA of FIG. 5) of the display panel (111 of FIG. 5), input through the input portions 211b into the output portions 211a, which is located corresponding to the non-display region (NA of FIG. 5), through the transmission portions 211c.

The optical fiber 211 has the transmission portion 211c, which is between the input portion 211b and the output portion 211a, inclined at a predetermined amount in order to have the inclined refracted structure toward the non-display region (NA of FIG. 5).

In other words, the transmission portion 211c of the second optical fiber 211 makes an angle "a" with a normal direction A of the display panel (111 of FIG. 5).

Accordingly, the outer side surface 405 includes a third vertical portion 405a which is perpendicular to the second top surface portion 401 and corresponds to the output portion 211a, a fourth vertical portion 405b which is perpendicular to the second bottom surface portion 403 and corresponds to the input portion 211b, and an outer inclined side surface 405c which connects the third and fourth vertical portions 405a and 405b and corresponds to the transmission portion 211c.

The frame type optical member 400 of this embodiment is inserted into the protection film 500. As shown in FIG. 6A, the protection film 500 may have a shape that substantially corresponds to the second top surface portion 401, the inner inclined side surface 407 and the outer side surface 405. As such, the protection film 500 may substantially cover all the surfaces except for the second bottom surface portion 403 of the frame type optical member 400.

In other words, the protection film 500 may include a fourth cover portion 501 corresponding to the second top surface portion 401, and fifth and sixth cover portions 503 and 505 corresponding to the inner inclined side surface 407 and the outer side surface 405, respectively.

The protection film 500 is made of a plastic material, such as polycarbonate (PC), poly methyl methacrylate (PMMA) or the like, or a polyethylene-based material containing a terephthalic acid of a good dimensional stability, such as polyethylene terephthalate (PET) or the like, and the protection film 300 can relieve an impact applied from the outside and protect the frame type optical member 400.

Particularly, this protection film 500 is easy to be restored to its shape even though an external force is applied, and thus an impact from the outside can be further relieved.

Figure 6B:
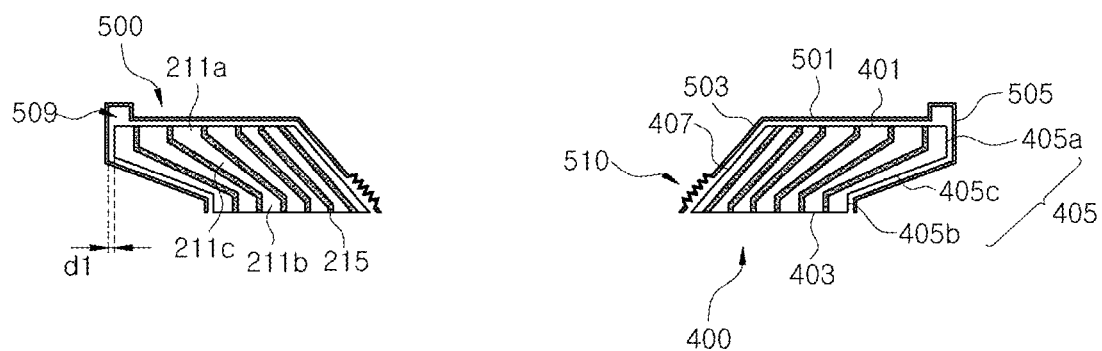

As shown in FIG. 6B, the protection film 500 is coupled to the frame type optical member 500 with a gap d1 of about 0.1 mm therebetween. Accordingly, an external impact can be further relieved, and also, the protection film 500 can be easily detached from and coupled to the frame type optical member 400.

Further, the protection film 500 may further include reinforcing protrusion portions 507, which are protruded from the fourth cover portion 501 and between the fourth cover portion 401 and the sixth cover portion 505.

Even though a collision happens between the neighboring frame type optical members 400, an impact can be relieved because of the reinforcing protrusion portions 507, and thus the frame type optical members 400 can be prevented from being.

Figure 6C:
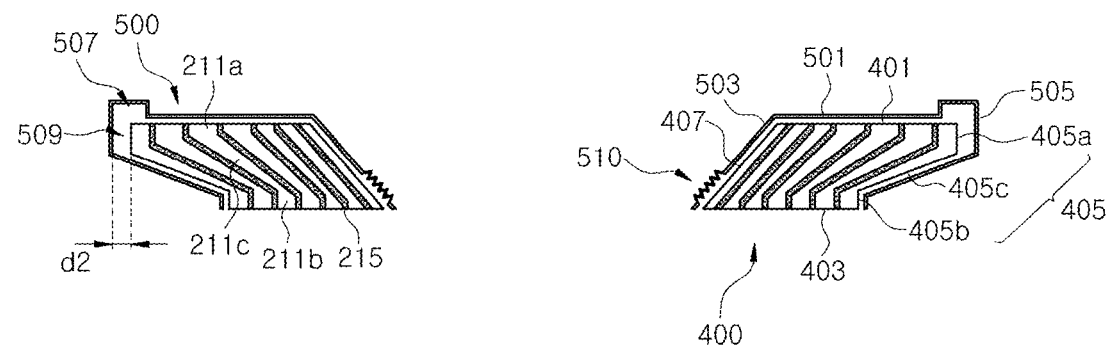

Further, as shown in FIG. 6C, by forming a gap d2 of about 0.1 mm to 1 mm between the third vertical portion 405a of the frame type optical member 400 and the sixth cover portion 505, an impact relieving region 509 may be obtained between the third vertical portion 405a and the protection film 500.

Even though a collision happens between the neighboring frame type optical members 400, an impact can be further relieved because of the impact relieving region 509, and thus the frame type optical members 400 can be prevented from being broken.

As described above, in the multi-panel display device (100 of FIG. 4) of this embodiment, the frame type optical member 400 on each of the display devices (110a and 110b of FIG. 5) is inserted into and coupled to the protection film 500. Accordingly, breakage of the frame type optical members 400 due to collision therebetween can be prevented.

Particularly, the protection film 500 may include patterns 510 at an end of the fifth cover portion 503 corresponding to the inner inclined side surface 407 of the frame type optical member 400.

The patterns 510 may have a prism mountain shape that hill and valley, which each extend along a length direction of the protection film 500 (or the inner inclined side surface 407), are repeated along the inclined direction, or a lenticular lens shape. The length direction of the protection film 500 (or the inner inclined side surface 407) is a normal direction to a plane of the drawings. Alternatively, the patterns 510 may have a shape such that a plurality of pyramid-shaped polygons are arranged in the length direction of the protection film 500, and in this case, the pyramid-shaped polygons form each line pattern along the length direction, and a plurality of line pattern are repeated along the inclined direction to form the patterns 510.

When the patterns 510 have the prism mountain shape, this shape may be formed such that corners of the prism mountain may have a curve-treated (or round-treated) shape. Through the patterns 510, a rainbow phenomenon which happens due to a chromatic dispersion around an inner-side boundary portion of the frame type optical member 400 in the display region (AA of FIG. 5) of the display devices (110a and 110b of FIG. 5) can be reduced.

In detail, since the frame type optical member 400 is located on the portion of the periphery of the display region (AA of FIG. 5) of the display panel (111 of FIG. 5) and on the bezel region D, the boundary portion corresponding to the inner inclined side surface 407 of the optical member 400 is located in the display region (AA of FIG. 5) of the display panel (111 of FIG. 5).

Further, a direction (i.e., a length direction) of the boundary portion of the frame type optical member 400 matches a direction of pixel lines which are each formed by the pixel regions arranged along a direction (i.e., a normal direction to the plane of the drawings). Accordingly, due to an overlap of a line pattern with a pitch formed by the optical fibers 211 of the boundary portion of the optical member 400 with a pixel line pattern with a pitch, an optical defect happens.

In other words, by optical interference by the line patterns having different pitches, a moire phenomenon happens, and thus a rainbow phenomenon due to a color dispersion happens. As shown in FIG. 7, the rainbow phenomenon is that the pixel regions (P of FIG. 5) corresponding to an end portion of the inner inclined side surface 407 of the frame type optical member 400 are seen blurred by the moire phenomenon thus stand out compared with neighboring pixel regions (P of FIG. 5) having other colors.

Such rainbow phenomenon causes unbalance of brightness of an image realized by the display panel (111 of FIG. 5), and this arises as a problem of the multi-panel display device (100 of FIG. 4).

Accordingly, in the multi-panel display device (100 of FIG. 4) of this embodiment, the patterns 510 are employed at the end portion of the fifth cover portion 503 of the protection film 500 which receives the frame type optical member 400 therein to reduce a breakage of the frame optical member 400, and the patterns 510 are located corresponding to the boundary portion by the inner inclined side surface 407 of the frame type optical member 400. Thus, through a haze phenomenon by the patterns 510, the rainbow phenomenon is concealed.

Accordingly, as shown in FIG. 7B, it can be prevented that the pixel regions (P of FIG. 5) corresponding to the end portion of the inner inclined side surface 407 of the frame type optical member 400 stand out compared with neighboring pixel regions (P of FIG. 5) having other colors. Thus, unbalance of brightness of an image realized by the display panel (111 of FIG. 5) can be reduced.

When the pitch d3 of the patterns 510 is equal to a width, which is perpendicular to a direction of the pixel line, of the pixel region (P of FIG. 5), the moire phenomenon is caused between the patterns 510 and the pixel regions (P of FIG. 5). Accordingly, the pitch d3 of the patterns 510 being about two or three times the width of the pixel region (P of FIG. 5) can prevent the moire phenomenon and also improve concealing the rainbow phenomenon because of the haze phenomenon of the patterns 510.

Figure 6D:
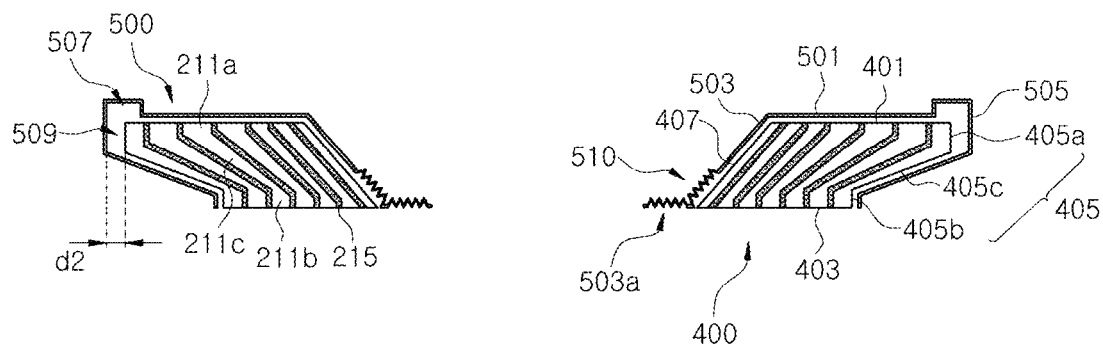

Furthermore, as shown in FIG. 6D, that the fifth cover portion 503 corresponding to the inner inclined side surface 407 of the frame type optical member 400 may include an extension portion 503a such that the fifth cover portion 503 is parallel with the fourth cover portion 501. In this case, the patterns 510 may extends to the extension portion 503a.

The extension portion 503a of the fifth cover portion 503 may be located directly on the display region (AA of FIG. 5) of the display panel (111 of FIG. 5).

Since the extension portion 503a is included in the fifth cover portion 503 and the patterns 510 extends up to the extension portion 503a, the boundary portion by the frame type optical member 400 becomes ambiguous and thus concealing of the rainbow phenomenon can be further improved.

As described above, in the multi-panel display device (100 of FIG. 4) of this embodiment, the frame type optical member 400 on each of the display devices (110a and 110b of FIG. 5) is inserted into and coupled to the protection film 500. Thus, when realizing one image through the display devices (110a and 110b of FIG. 5), an image disconnection phenomenon at the bezel region (D of FIG. 5) can be reduced, and also, breakage of the frame type optical members 400 due to collision therebetween can be prevented.

Furthermore, the patterns 510 are employed at the end portion of the fifth cover portion 503 of the protection film 500 which receives the frame type optical member 400 therein to reduce a breakage of the frame optical member 400, and the patterns 510 are located corresponding to the boundary portion by the inner inclined side surface 407 of the frame type optical member 400. Thus, unbalance of brightness of an image realized by the display panel (111 of FIG. 5) can be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multi-panel display device, comprising:
a first display device including a first display region and a first non-display region surrounding the first display region;
a first optical member located on the first display device and including a first set of optical fibers; and
a first protection film covering an outside of the first optical member,
wherein the first optical member includes:
a first top surface portion to output an image,
a first bottom surface portion opposite to the first top surface portion, and
first and second side surfaces connecting the first top surface portion and the first bottom surface portion, and
wherein the first protection film includes:
a first cover portion corresponding to the first top surface portion,
a second cover portion connected to the first cover portion at a first end, the second cover portion corresponding to the first side surface, the second cover portion bent from the first cover portion;
a third cover portion corresponding to the second side surface, the third cover portion bent from the first cover portion;
a fourth cover portion connected to the second cover portion at a second end opposite to the first end, the fourth cover portion corresponding to the first side surface, the fourth cover portion angled from the second cover portion, wherein at least a portion of the fourth cover portion is under a first optical fiber of the first optical member; and
a fifth cover portion corresponding to the second side surface, the fifth cover portion angled from the third cover portion, wherein at least a portion of the fifth cover portion is under a second optical fiber of the first optical member.

2. The device of claim 1, wherein there is a first gap between the first optical member and the first protection film.

3. The device of claim 2, wherein the first optical member is an entire-surface type optical member located over an entire surface of the first display device.

4. The device of claim 3, wherein the first protection film includes a reinforcing protrusion portion that protrudes from the first cover portion and is between the first cover portion and each of the second and third cover portions.

5. The device of claim 3, wherein at least a subset of the first set of optical fibers includes:
an input portion corresponding to the first display region and located at the first bottom surface portion,
an output portion located at the first top surface portion, and
a transmission portion between the input portion and the output portion,
wherein each of the side surfaces includes:
a first vertical portion perpendicular to the first top surface portion and corresponding to the output portion,
a second vertical portion perpendicular to the first bottom surface portion and corresponding to the input portion, and
an inclined surface connecting the first and second vertical portions and corresponding to the transmission portion.

6. The device of claim 5, wherein an impact relieving region is configured between the first vertical portion and each of the second and third cover portions, and has a second gap greater than the first gap.

7. The device of claim 6, wherein the first protection film includes a reinforcing protrusion portion that protrudes from the first cover portion and is between the first cover portion and each of the second and third cover portions.

8. The device of claim 5, wherein the first optical member is divided into:
a first enlarging region that corresponds to the first non-display region and a portion of the first display region adjacent to the first non-display region, and
a first non-enlarging region corresponding to the first display region,
wherein the first set of optical fibers include:
a third optical fiber located at the first non-enlarging region, and
a fourth optical fiber, of a refracted structure, that is located at the first enlarging region, the fourth optical fiber including:
an input portion located over the first display region,
an output portion located over the first non-display region, and
a transmission portion refracted.

9. The device of claim 2,
wherein the first optical member is a frame type optical member located corresponding to a peripheral portion of the first display device,
wherein the first optical member includes:
a second top surface portion to output an image,
a second bottom surface portion opposite to the second top surface portion, and
an inner inclined side surface and an outer side surface connecting the second top surface portion and the second bottom surface portion, and
wherein the first protection film includes:
a sixth cover portion corresponding to the second top surface portion,
a seventh cover portion corresponding to the inner inclined side surface, and
a eighth cover portion corresponding to the outer side surface.

10. The device of claim 9, wherein the first protection film includes patterns at an end portion of the seventh cover portion.

11. The device of claim 10, wherein the patterns are one of (a) a prism mountain shape that hill and valley repeatedly, (b) a lenticular lens shape, and (b) a shape such that a plurality of pyramid-shaped polygons are arranged in a length direction of the first protection film.

12. The device of claim 11, wherein corners of the prism mountain shape have a curve-treated shape.

13. The device of claim 10, wherein a pitch of the patterns is within two to three times a width, perpendicular to a pixel line, of a pixel region.

14. The device of claim 10, wherein the seventh cover portion includes an extension portion parallel with the sixth cover portion, and wherein the patterns extend to the extension portion.

15. The device of claim 9, wherein the first protection film includes a reinforcing protrusion portion that protrudes from the sixth cover portion and is between the sixth cover portion and each of the seventh and eighth cover portions.

16. The device of claim 9, wherein at least a subset of the first set of optical fibers includes:
 an input portion corresponding to the first display region and located at the second bottom surface portion,
 an output portion located at the second top surface portion, and
 a transmission portion between the input portion and the output portion,
 wherein the outer side surface includes:
  a third vertical portion perpendicular to the second top surface portion and corresponding to the input portion,
  a fourth vertical portion perpendicular to the second bottom surface portion and corresponding to the input portion, and
  an outer inclined side surface connecting the third and fourth vertical portions and corresponding to the transmission portion.

17. The device of claim 16, wherein an impact relieving region is configured between the third vertical portion and each of the seventh and eighth cover portions, and has a second gap greater than the first gap.

18. The device of claim 17, wherein the first protection film includes a reinforcing protrusion portion that protrudes from the sixth cover portion and is between the sixth cover portion and each of the seventh and eighth cover portions.

19. The device of claim 16, wherein the input portion is located over the first display region, the output portion is located over the first non-display region, and the transmission portion is refracted.

20. The device of claim 1, further comprising:
 a second display device that is at a side of the first display device and includes a second display region and a second non-display region surrounding the second display region;
 a second optical member located on the second display device and including a second set of optical fibers; and
 a second protection film covering an outside of the second optical member.

\* \* \* \* \*